United States Patent
Jacobsson

(10) Patent No.: US 6,840,723 B2
(45) Date of Patent: Jan. 11, 2005

(54) WORKING UNIT FOR A MACHINE OPERATED TOOL CARRIER

(75) Inventor: Rolf Alexis Jacobsson, Saltsjö-Boo (SE)

(73) Assignee: Atlas Copco Tools AB, Nacka (SE)

( * ) Notice: Subject to any disclaimer, the term of this patent is extended or adjusted under 35 U.S.C. 154(b) by 0 days.

(21) Appl. No.: 10/451,349

(22) PCT Filed: Dec. 20, 2001

(86) PCT No.: PCT/SE01/02837

§ 371 (c)(1),
(2), (4) Date: Jun. 18, 2003

(87) PCT Pub. No.: WO02/051584

PCT Pub. Date: Jul. 4, 2002

(65) Prior Publication Data

US 2004/0042864 A1 Mar. 4, 2004

(30) Foreign Application Priority Data

Dec. 22, 2000 (SE) .............................................. 0004840

(51) Int. Cl.⁷ .................................................. B23C 9/00
(52) U.S. Cl. ....................... 409/231; 409/230; 409/144; 408/702; 408/124
(58) Field of Search ............................... 409/230, 144, 409/231, 186, 187, 193, 194, 207; 408/702, 124, 9

(56) References Cited

U.S. PATENT DOCUMENTS

| 4,566,849 A | 1/1986 | Flink |
| 4,716,657 A | * 1/1988 | Collingwood ................ 408/147 |
| 5,193,953 A | * 3/1993 | Jesinger ....................... 409/231 |
| 5,507,642 A | 4/1996 | Wohlgemuth |
| 5,564,872 A | * 10/1996 | Veil et al. .................... 409/230 |
| 5,636,949 A | * 6/1997 | Nakamura et al. .......... 409/230 |
| 5,674,032 A | * 10/1997 | Slocum et al. .............. 409/231 |
| 5,807,108 A | 9/1998 | Schwenoha |

FOREIGN PATENT DOCUMENTS

DE    3819799 A1    2/1989

\* cited by examiner

Primary Examiner—A. L. Wellington
Assistant Examiner—Dana Ross
(74) Attorney, Agent, or Firm—Frishauf, Holtz, Goodman & Chick, P.C.

(57) ABSTRACT

A working unit intended to be mounted on a movable machine operated tool support includes a casing which is attached to the tool support and which supports a pneumatic turbine motor with a rotor a shank end mill type machining tool with a cutter portion extending out of the casing and a shank portion rotatively journalled in the casing. The machining tool shank portion is rigidly integrated with a turbine wheel to form the turbine rotor. A flow control valve is arranged to deliver pressure air to the turbine motor. The turbine rotor is provided with a generator device for delivering a speed responsive output voltage to a control unit which is arranged to make the flow control valve adjust the power supply to the rotation motor so as to maintain the rotation speed at a desired predetermined level.

4 Claims, 2 Drawing Sheets

WORKING UNIT FOR A MACHINE OPERATED TOOL CARRIER

This application is a U.S. National Phase Application under 35 USC. 371 of International Application PCT/SE01/02837 filed Dec. 20, 2001.

FIELD OF THE INVENTION

The invention relates to a working unit intended to be mounted on a movable machine operated tool carrier and comprises a casing attached to the tool carrier, a rotation motor supported in the casing, and a machining tool rotatively journalled relative to the casing and driven by the motor.

BACKGROUND OF THE INVENTION

Previously known working units of the type having a motor and a machining tool carrying output spindle suffer from a rather slow working action. This is due both to the fact that the working unit has a relatively large mass and to the fact that the speed of the motor is relatively low. By nature, a heavy working unit is difficult to move at high velocity either in a plain reciprocating movement or in a more or less complicated working pattern, which means that the working process time will be undesirably long. Also, a relatively slow motor limits the maximum feed speed of the working tool relative to the work piece.

A heavy output spindle unit including a tool chuck also means a large rotating mass, which tends to create vibration problems at high speed rotation. It is difficult to avoid resonance frequencies in such a known device.

One reason why previously known movable working units has a relatively large mass is a rather complex design of the motor and output spindle arrangement.

Another reason why previous working units has a large mass is the use of electric motors with all their heavy iron cores and copper windings. Electric motors also have a limited rotation speed which limits the rotation speed of the working tool, and, thereby, the possible feed speed of the working tool.

SUMMARY OF THE INVENTION

The main object of the invention is to solve the above problems by accomplishing an improved working unit for mounting on a movable machine operated tool carrier which due to a simple design, a low weight and a high machining tool rotation speed provides a fast working action and, thereby, shortened working process times.

Further objects and advantages of the invention will appear from the following specification and claims.

A preferred embodiment of the invention is below described in detail with reference to the accompanying drawing figures.

Figure 1:
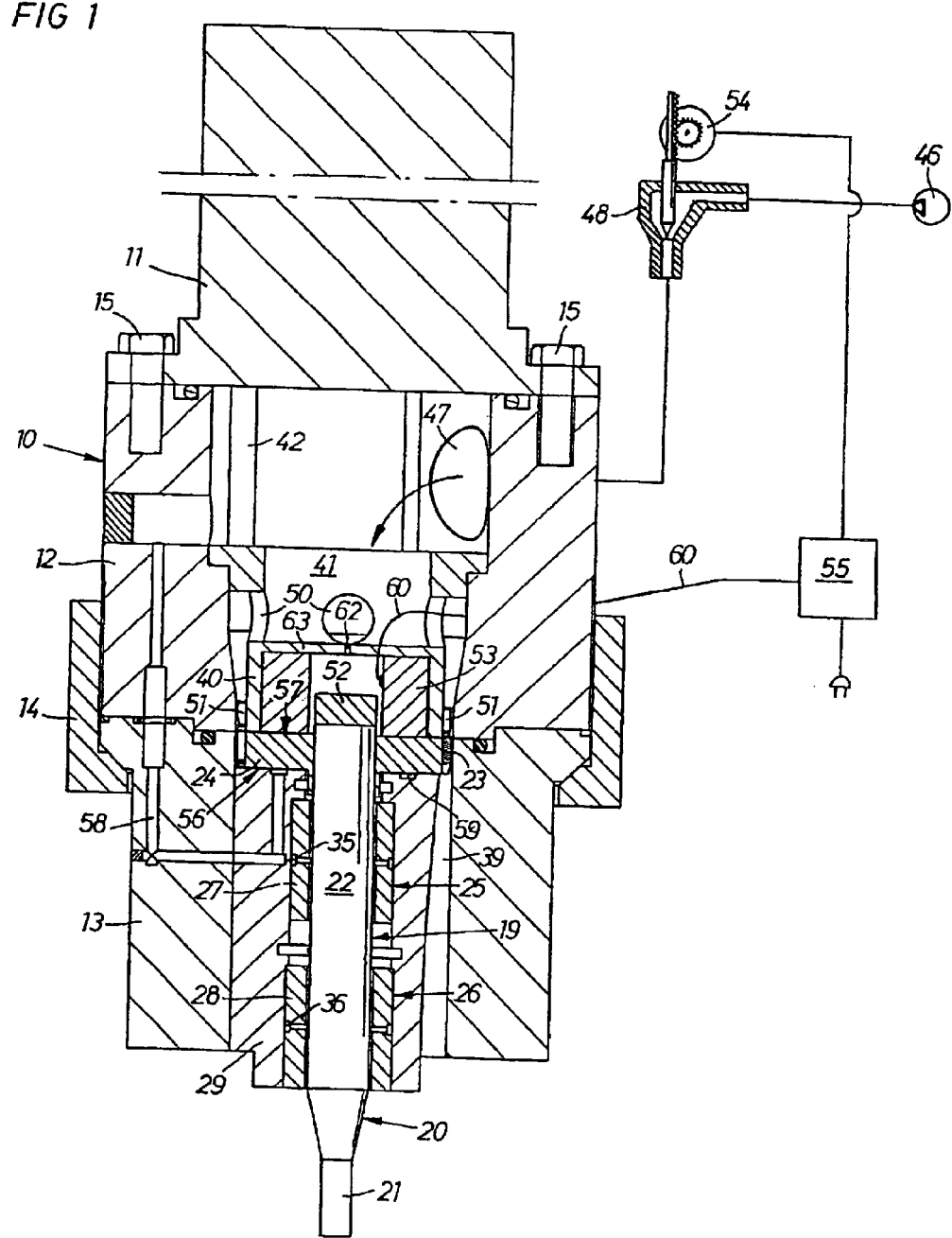
FIG. 1 shows a longitudinal section through a working unit according to the invention and illustrates schematically a speed control system connected to the working unit.

The working unit illustrated in the drawings comprises a casing 10 with a rear mounting neck 11 for attaching the working unit to a movable machine operated tool carrier (not shown). The casing 10 is divided into a central section 12 and a front section 13. The front section 13 is clamped to the central section 12 by a nut 14. The rear mounting neck 11 is secured to the central section 12 by screws 15.

DETAILED DESCRIPTION

In the casing 20 there is provided a rotation motor in the form of a pressure air operated turbine with a rotor 19, and a machining or milling tool 20 in the form of an end cutter. At its forward end, the milling tool 20 is formed with a cutter portion 21 extending out in front of the casing 10, and a shank 22 extending into the casing 10. A turbine wheel 24 carrying a circumferential row of drive blades 23 is rigidly secured to the inner end of the shank 22 which means that milling tool 20 and the turbine wheel 24 together form the turbine rotor 19 and the shank 22 forms the rotation axle of the rotor 19. The turbine wheel 24 is secured to the milling tool shank 22 by a press and/or fit.

By forming the motor rotor as a separate turbine wheel 24 rigidly mounted on the tool shank 22 as described above a standard type shank end mill can be used as machining tool 20. This means that a working unit according to the invention is simple and inexpensive to manufacture.

Figure 2:
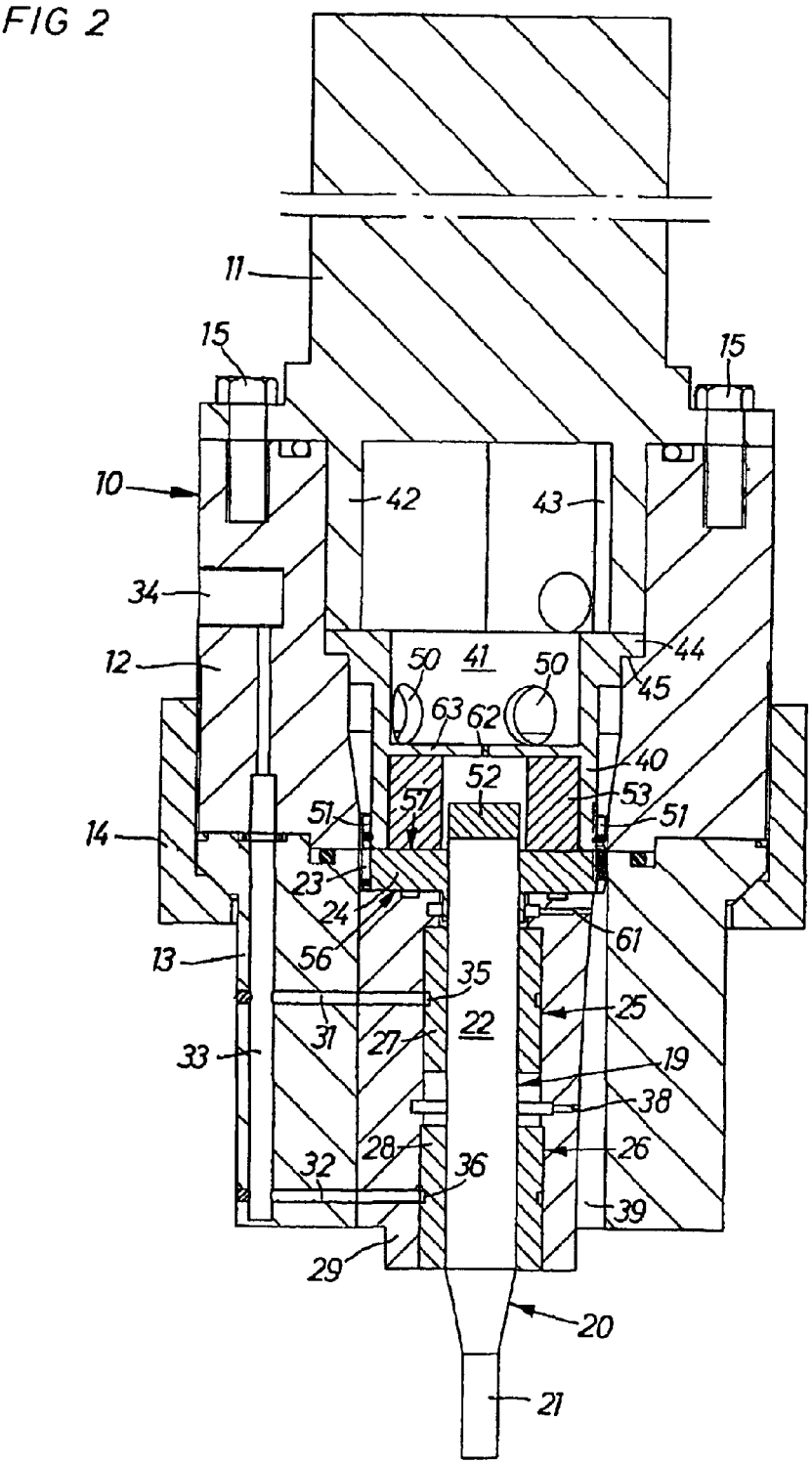
FIG. 2 shows another longitudinal section through the working unit in FIG. 1.

The turbine rotor 19, i.e. the tool shank 22, is radially supported relative to the casing 10 by two hydro-dynamic bearings 25,26. These bearings 25,26 comprise two bushings 27,28 which are rigidly secured in a support sleeve 29 which in turn is rigidly secured in the front section 13 of the casing 10. As illustrated in FIG. 2, both bushings 27,28 are supplied with a liquid via two radial passages 31,32, an axially extending passage 33 and a supply opening 34 in the casing 10. Preferably, the liquid being used as bearing medium is the liquid used for lubricating and cooling the cutter end portion 21 of the milling tool 20 during operation.

As illustrated in FIG. 1, the bushings 27,28 are provided with outer circumferential grooves 35,36 which via small diameter radial openings communicate fluid from the radial passages 31,32 to the inner circumference of the bushings 27,28. Between the two bushings 27,28, the support sleeve 29 is provided with a radial outlet 38 for draining fluid into an outlet passage 39. See FIG. 2.

The turbine motor comprises a nozzle sleeve 40 which is located in the central casing section 12 and defines an air communication chamber 41. The nozzle sleeve 40 is axially locked in one direction by a couple of axial extensions 42,43 on the mounting neck 11 extending into the casing section 12 and in the opposite direction by a shoulder 44 on the nozzle sleeve 40 in co-operation with a shoulder 45 in the casing 10. The fluid communication chamber 41 is supplied with pressure air from a pressure air source 46 via a conduit 37 and an inlet opening 47 and a flow control valve 48. See FIG. 1. The nozzle sleeve 40 is formed with radial air feed openings 50 and a number of nozzles 51 for directing a flow of pressure air onto the drive blades 23 of the turbine wheel 24.

At its rear end, the turbine rotor 19 is provided with a permanent magnet 52 which together with a stationary winding coil 53 rigidly secured in the nozzle sleeve 40 forms a tacho-generator. This generator delivers a speed responsive output voltage and forms a part of a speed governing device which also includes the air inlet flow control valve 48 and a control unit 55. The control unit 55 is connected to the winding coil 53 by means of a cable 60. The routing of the cable 60 inside the casing 10 is schematically illustrated only.

The flow control valve 48 is activated by a reversible electric servo motor 54 which is connected to the control unit 55. At a desired predetermined turbine speed, the generator delivers a voltage of a certain magnitude. Depending on the actual voltage magnitude of the generator being above or below this certain voltage magnitude, the control unit 55 will deliver either a positive or a negative voltage to the servo motor 54, thereby making the latter activate the flow control valve 48 in an opening or a closing direction, respectively.

Moreover, the turbine rotor 19 is axially supported by two aerodynamic bearings 56, 57 located on opposite sides of the turbine wheel 24. Pressure air is supplied to the forward bearing 56 via a passage 58 communicating with the air communication chamber 41 and is drained from the bearing via a radial opening 61. The passage 58 communicates with an annular groove 59 at the rear end surface of the support sleeve 29 to supply pressure air and create an air layer between the turbine wheel 24 and the sleeve 29.

The rear axial bearing 57 is formed between the turbine wheel 24 and the winding coil 53, and pressure air is supplied to this bearing 57 from the air communication chamber 41 via a flow restricting opening 62 in a transverse wall 63 of the nozzle sleeve 40.

In operation, it is assumed that the working unit is attached to a movable machine operated tool carrier of any suitable type, and that pressure air is supplied from the pressure air source 46 via the flow control valve 48, the conduit 37, the inlet opening 47 and the air communication chamber 41 to start the turbine. Before the turbine wheel 24 has reached the desired predetermined rotation speed, the flow control valve 48 is maintained wide open to deliver a powerful pressure air flow to the working unit. The supplied air passes the air communication chamber 41 and reaches the turbine nozzles 51 via the radial openings 50 to activate the turbine wheel 24. Downstream the turbine wheel drive blades 23, the air flow enters the outlet passage 39 in the front section 13 of the casing 10 and is exhausted from the working unit.

At the same time, pressure air enters the passage 58 and reaches the annular groove 59 of the forward bearing 56 to form an aerodynamic axial support in one direction for the turbine rotor 19. At the rear end of the rotor 19, pressure air reaches the rear end surface of the turbine wheel 24 via the opening 62 in the wall 63, thereby forming an aerodynamic support in the opposite direction for the rotor 19.

In parallel with pressure air being supplied for starting up the turbine rotor 19, lubricating and cooling liquid is supplied to the milling tool cutter end 21 in a common non-illustrated way. Lubricating and cooling liquid is also supplied to the radial bearings 25,26 via passages 33,31,32 and openings 35,36 where the liquid creates a hydrodynamic radial support for the milling tool shank 22, i.e. the turbine rotor 19. The liquid is drained successively to the outlet passage 39 via the radial opening 38.

Now, the rotor 19 is properly supported in the radial as well as in the axial directions and the supplied pressure air makes the turbine rotate at an increasing speed. As long as the speed has, not reached the desired level, the output voltage from the generator winding coil 53 is below the desired certain magnitude, and the flow control valve 48 is kept open to a relatively large extent to make the turbine wheel 24 accelerate. However, as the desired speed level is reached and exceeded to some extent the generator voltage becomes too high, and the control unit 55 will start to deliver a negative output voltage to the flow valve servo-motor 54 such that the latter will start moving the flow control valve 48 towards a smaller opening area to reduce the pressure air flow to the turbine nozzles 51 and, thereby, reducing the turbine speed. Should the turbine speed decrease too much under the desired predetermined level, the control unit 55 would again change the output voltage to be positive and make the servomotor 54 rotate in the opposite direction, thereby shifting the flow control valve 48 to a larger opening area to increase the turbine speed. When the turbine wheel 24 is running at the desired predetermined rotation speed, the control unit 55 will not deliver any voltage at all.

By the working unit according to the invention there is obtained a structurally simple and light device which is capable of operating at a very high speed thanks to a rotor spindle which is not only small and light but which is fully integrated with the turbine motor to an integrated unit. The device according to the invention is also capable of high speed rotation and long service life because of the friction-less bearings supporting the rotor both in the radial direction and the axial direction. By forming the turbine motor as a separate turbine wheel rigidly mounted directly on the machining tool shank portion by a simple press fit or a shrinkage fit a standard type end mill may be used without any special adaptation for this particular purpose.

What is claimed is:

1. A pneumatic power tool, comprising a housing, and a rotation motor supported in the housing and having a rotor provided with drive blades and a working implement, wherein:

the housing contains; (i) a pressure air supply passage for ducting pressure air to the drive blades, (ii) a speed governing device comprising a flow control valve communicating with the air supply passage, and (iii) a speed responsive activating device comprising: (a) an electric generator, (b) a servo motor mechanically coupled to the flow control valve, and (c) a control unit arranged to activate the servo motor in response to a voltage delivered by the generator so as to adjust the flow control valve for maintaining the motor speed at a predetermined speed level.

2. The power tool according to claim 1, wherein the generator comprises a permanent magnet secured to the rotor, and a winding coil supported in the housing.

3. The power tool according to claim 1, wherein the working implement comprises a shank portion, and said shank portion forms a part of the rotor.

4. The power tool according to claim 2, wherein the working implement comprises a shank portion, and said shank portion forms a part of the rotor.

* * * * *